(12) United States Patent
Zhang et al.

(10) Patent No.: US 11,646,447 B2
(45) Date of Patent: May 9, 2023

(54) ELECTROLYTE AND ELECTROCHEMICAL DEVICE

(71) Applicant: NINGDE AMPEREX TECHNOLOGY LIMITED, Ningde (CN)

(72) Inventors: Shuirong Zhang, Ningde (CN); Wenqiang Li, Ningde (CN); Juan Ma, Ningde (CN); Chao Tang, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 301 days.

(21) Appl. No.: 16/735,214

(22) Filed: Jan. 6, 2020

(65) Prior Publication Data

US 2020/0243907 A1 Jul. 30, 2020

(30) Foreign Application Priority Data

Jan. 25, 2019 (CN) .......................... 201910071207.0

(51) Int. Cl.
*H01M 10/0567* (2010.01)
*H01M 10/0568* (2010.01)

(52) U.S. Cl.
CPC ... *H01M 10/0567* (2013.01); *H01M 10/0568* (2013.01); *H01M 2220/30* (2013.01); *H01M 2300/0025* (2013.01)

(58) Field of Classification Search
None
See application file for complete search history.

(56) References Cited

U.S. PATENT DOCUMENTS

| | | | |
|---|---|---|---|
| 2017/0331155 A1 | 11/2017 | Yang et al. | |
| 2017/0346127 A1* | 11/2017 | Zhang | H01M 4/62 |
| 2018/0183104 A1* | 6/2018 | Fujii | H01M 10/056 |
| 2020/0066463 A1* | 2/2020 | Kinoshita | H01G 11/64 |

FOREIGN PATENT DOCUMENTS

| | | |
|---|---|---|
| CN | 101548425 A | 9/2009 |
| CN | 104766995 A | 7/2015 |
| CN | 105355968 A | 2/2016 |
| CN | 106159324 A | 11/2016 |
| CN | 106450452 A | 2/2017 |
| CN | 106486699 A | 3/2017 |
| CN | 107403950 | * 11/2017 |
| CN | 107408734 A | 11/2017 |
| CN | 107799822 A | 3/2018 |
| CN | 108064425 A | 5/2018 |
| CN | 108701864 A | 10/2018 |
| CN | 109196689 A | 1/2019 |
| CN | 109860703 A | 6/2019 |
| TW | 201624816 A | 7/2016 |
| WO | 2018200631 A1 | 11/2018 |
| WO | 2018216866 A1 | 11/2018 |
| WO | 2019010544 A1 | 1/2019 |

OTHER PUBLICATIONS

CN 106159324 English translation. Zhao. China. Nov. 23, 2016 (Year: 2016).*
CN107403950 English translation. Fu et al. China. Nov. 28, 2017 (Year: 2017).*
Chinese Notification of Grant of Patent Right and Search Report dated Mar. 2, 2021 in Chinese counterpart application CN201910071207.0, 4 pages in Chinese.
"Research Progress in New-Type High Voltage Electrolyte used for Lithium Batteries," Zhang et al., Chemical Bulletin, vol. 80, No. 11, pp. 1021-1025, Nov. 18, 2017, 6 pages in Chinese with English abstract.
"Review of electrolyte additives for ternary cathode battery," Deng et al., Acta Chimica Sinica, vol. 76, No. 4, pp. 1-11, Apr. 15, 2018, 19 pages in Chinese with English abstract.
International Search Report dated Apr. 1, 2020 in counterpart PCT application PCT/CN2020/072505, 5 pages.
Chinese First Office Action dated May 8, 2020 in counterpart Chinese application 201910071207.0, 9 pages.
Extended European Search Report dated Dec. 15, 2022 in counterpart European application EP201711016.4, 8 pages in English.

* cited by examiner

*Primary Examiner* — Christopher P Domone
(74) *Attorney, Agent, or Firm* — Juan Carlos A. Marquez; Marquez IP Law Office, PLLC

(57) ABSTRACT

The present application relates to an electrolyte and an electrochemical device. The electrolyte comprises a cesium salt and a nitrile compound. The electrolyte provided in the present application improves rapid charge-discharge performance and cycle performance of a lithium-ion battery while improving the problem of battery gassing during continuous charge.

19 Claims, No Drawings

ELECTROLYTE AND ELECTROCHEMICAL DEVICE

CROSS REFERENCE TO RELATED APPLICATIONS

The present application claims the benefit of priority from the China Patent Application No. 201910071207.0, filed on 25 Jan. 2019, the disclosure of which is hereby incorporated by reference in its entirety.

BACKGROUND

1. Technical Field

The present application relates to energy storage technologies, and more particularly to an electrolyte and an electrochemical device containing the same.

2. Description of the Related Art

Lithium-ion batteries are widely used in wearable devices, smart phones, unmanned aerial vehicles, electric vehicles, and other fields due to their advantages in such areas as high energy density, long cycle life, and no memory effect. With the broadening of the application of lithium-ion batteries and the development of modern information technologies, lithium-ion batteries are required to have more performances. For example, the battery is required to be able to rapidly charge and discharge. In addition, since the problem of battery gassing occurs frequently after continuous charge, it is necessary to reduce the problem of battery gassing during continuous charge. How to rapidly charge and discharge the battery and ensure safety during continuous charge of lithium-ion batteries has become an urgent problem in the industry.

Based on this, the present application provides an electrolyte which can improve the rapid charge-discharge performance of a battery while improving the problem of battery gassing during continuous charge.

SUMMARY

An embodiment of the present application provides an electrolyte and an electrochemical device containing the same, where the electrolyte comprises a cesium salt and a nitrile compound. The electrolyte provided in the present application can improve the rapid charge-discharge performance and cycle performance of a lithium-ion battery while improving the problem of battery gassing during continuous charge.

In an embodiment, the present application provides an electrolyte comprising a cesium salt and a nitrile compound.

According to an embodiment of the present application, the cesium salt includes one or more of cesium hexafluorophosphate, cesium oxalate, cesium nitrate, cesium trifluoromethanesulfonate, cesium bis(trifluoromethylsulphonyl) imide, cesium tetrafluoroborate and cesium carbonate.

According to an embodiment of the present application, the content of the cesium salt is about 0.01 wt % to about 1.5 wt % based on the total weight of the electrolyte.

According to an embodiment of the present application, the content of the cesium salt is about 0.05 wt % to about 1 wt % based on the total weight of the electrolyte.

According to an embodiment of the present application, the nitrile compound includes at least one of the compounds of Formula 1 to Formula 4:

wherein $R_{11}$ is selected from a substituted or unsubstituted $C_{1-12}$ alkylene group or a substituted or unsubstituted $C_{1-12}$ alkyleneoxy group;

wherein $R_{21}$ and $R_{22}$ are each independently selected from a bond or a substituted or unsubstituted $C_{1-12}$ alkylene group;

wherein $R_{31}$, $R_{32}$, and $R_{33}$ are each independently selected from a bond, a substituted or unsubstituted $C_{1-12}$ alkylene group or a substituted or unsubstituted $C_{1-12}$ alkyleneoxy group; and wherein $R_{41}$ is selected from a substituted or unsubstituted $C_{1-12}$ alkylene group, a substituted or unsubstituted $C_{2-12}$ alkenylene group, a substituted or unsubstituted $C_{6-26}$ arylene group, a substituted or unsubstituted $C_{6-10}$ cycloalkylene group or a substituted or unsubstituted $C_{2-12}$ heterocyclylene group;

wherein when substituted, the substituent is halogen.

According to an embodiment of the present application, the nitrile compound includes at least one of:

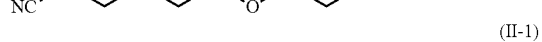
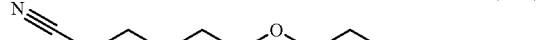

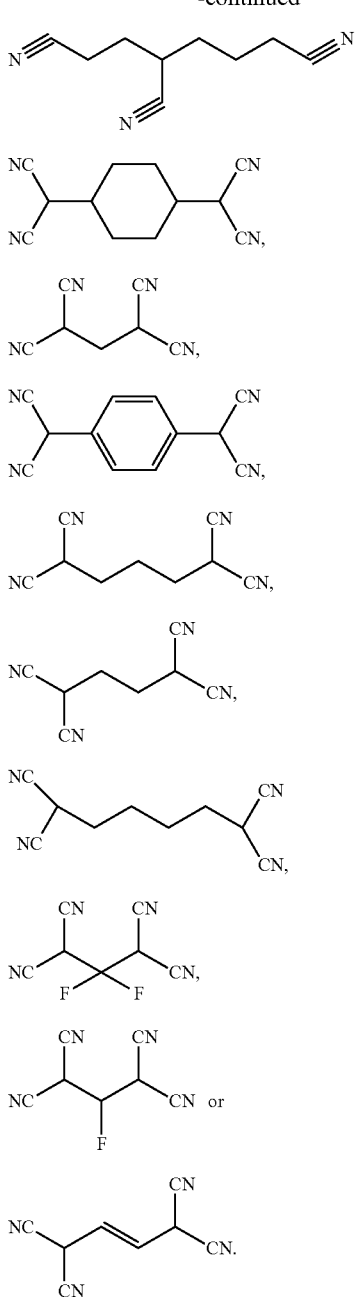

According to an embodiment of the present application, the content of the nitrile compound is about 0.5 wt % to about 12 wt % based on the total weight of the electrolyte.

According to an embodiment of the present application, the content of the nitrile compound is about 1 wt % to about 8 wt % based on the total weight of the electrolyte.

According to an embodiment of the present application, the electrolyte further comprises additives, wherein the additives comprise lithium difluorophosphate, 1,3,2-dioxathiolane-2,2-dioxide, catechol sulfate or any combination thereof.

According to an embodiment of the present application, the content of the additive is about 0.05 wt % to about 5 wt % based on the total weight of the electrolyte.

In another embodiment, the present application provides an electrochemical device comprising an electrode and an electrolyte which is any electrolyte as described above.

In another embodiment, the present application provides an electronic device including the electrochemical device.

Additional aspects and advantages of the embodiments of the present application will be partially described, illustrated or explained by way of examples in the description which follows.

DETAILED DESCRIPTION

As used herein, the term "about" is used to describe and depict minor variations. When used in connection with an event or circumstance, the term may refer to an example in which the event or circumstance occurs precisely, and an example in which the event or circumstance occurs approximately. For example, when used in connection with a value, the term may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%, or less than or equal to ±0.01%. In addition, amounts, ratios, and other values are sometimes presented in a range format in this application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

In the detailed description and claims, a list of items connected by the term "one of" means any one of the listed items. For example, if items A and B are listed, the phrase "one of A and B" means only A or only B. In another example, if items A, B, and C are listed, then the phrase "one of A, B, and C" means only A; only B; or only C. Item A may include a single or multiple elements. Item B may include a single or multiple elements. Item C may include a single or multiple elements.

In the detailed description and claims, a list of items connected by the term "at least one of" means any combination of the listed items. For example, if items A and B are listed, the phrase "at least one of A and B" means only A; only B; or A and B. In another example, if items A, B, and C are listed, then the phrase "at least one of A, B, and C" means only A; only B; only C; A and B (excluding C); A and C (excluding B); B and C (excluding A); or A, B, and C. Item A may include a single or multiple elements. Item B may include a single or multiple elements. Item C may include a single or multiple elements.

As used herein, the term "alkylene group" means a linear or branched divalent saturated hydrocarbyl group. For example, the alkylene group may be an alkylene group having 1-20 carbon atoms, an alkylene group having 1-15 carbon atoms, an alkylene group having 1-12 carbon atoms, an alkylene group having 1-5 carbon atoms, an alkylene group having 5-20 carbon atoms, an alkylene group having 5-15 carbon atoms, or alkylene group having 5-10 carbon atoms. Representative alkylene group includes (for example) methylene, ethane-1,2-diyl ("ethylene"), propane-1,2-diyl, propane-1,3-diyl, butane-1, 4-diyl, pentane-1,5-diyl and the like. Additionally, the alkylene group can be optionally substituted.

As used herein, the term "cycloalkyl group" covers cyclic alkyl groups. The cycloalkyl group may be a cycloalkyl group having 3 to 20 carbon atoms, a cycloalkyl group having 6 to 20 carbon atoms, a cycloalkyl group having 3 to 12 carbon atoms, or a cycloalkyl group having 3 to 6 carbon atoms. For example, the cycloalkyl group may be cyclopropyl, cyclobutyl, cyclopentyl, cyclohexyl or the like. Additionally, the cycloalkyl group can be optionally substituted.

As used herein, the term "alkenylene group" covers both linear and branched alkenylene groups. When an alkenylene group having a specific number of carbon atoms is defined, it is intended to cover all geometric isomers having the carbon number. For example, the alkenylene group may be an alkenylene group having 2-20 carbon atoms, an alkenylene group having 2-15 carbon atoms, an alkenylene group having 2-10 carbon atoms, an alkenylene group having 2-5 carbon atoms, an alkenylene group having 5-20 carbon atoms, an alkenylene group having 5-15 carbon atoms, or alkenylene group having 5-10 carbon atoms. Representative alkenylene group includes (for example) ethenylene, propenylene, butenylene and the like. Additionally, the alkenylene group can be optionally substituted.

As used herein, the term "cycloalkylene group" covers cyclic alkylene groups. For example, the cycloalkylene group may be a cycloalkylene group having 3-20 carbon atoms, a cycloalkylene group having 3-15 carbon atoms, a cycloalkylene group having 3-10 carbon atoms, a cycloalkylene group having 3-6 carbon atoms, a cycloalkylene group having 5-20 carbon atoms, a cycloalkylene group having 5-15 carbon atoms, or a cycloalkylene group having 5-10 carbon atoms. Additionally, the cycloalkylene group can be optionally substituted. For example, the cycloalkylene group may be substituted by halogen including fluorine, chlorine, bromine, and iodine, an alkyl group, an aryl group or a heteroaryl group.

As used herein, the term "arylene" covers both monocyclic and polycyclic systems. A polycyclic ring may have two or more rings in which two carbons are shared by two adjacent rings (where the rings are "fused"), in which at least one of the rings is aromatic and other rings may be for example, a cycloalkyl group, a cycloalkenyl group, an aryl group, a heterocyclyl group and/or a heteroaryl group. For example, the arylene group may be a $C_6$-$C_{50}$ arylene group, a $C_6$-$C_{40}$ arylene group, a $C_6$-$C_{30}$ arylene group, a $C_6$-$C_{26}$ arylene group, a $C_6$-$C_{20}$ arylene group, or a $C_6$-$C_{10}$ arylene group. Additionally, the arylene group can be optionally substituted.

As used herein, the term "alkyleneoxy" refers to a -L-O— group, wherein L is an alkylene group. For example, the alkyleneoxy group may be an alkyleneoxy group having 1-20 carbon atoms, an alkyleneoxy group having 1-12 carbon atoms, an alkyleneoxy group having 1-5 carbon atoms, an alkyleneoxy group having 5-20 carbon atoms, an alkyleneoxy group having 5-15 carbon atoms, or alkyleneoxy group having 5-10 carbon atoms. Additionally, the alkyleneoxy group can be optionally substituted.

As used herein, the term "heterocyclylene group" covers both aromatic and non-aromatic cyclic groups. For example, the heterocyclylene group is a $C_2$-$C_{50}$ heterocyclylene group, a $C_2$-$C_{40}$ heterocyclylene group, a $C_2$-$C_{30}$ heterocyclylene group, a $C_2$-$C_{20}$ heterocyclylene group, a $C_2$-$C_{10}$ heterocyclylene group, or a $C_2$-$C_6$ heterocyclylene group containing at least one heteroatom. Additionally, the heterocyclylene group can be optionally substituted.

As used herein, the term "heteroatom" covers O, S, N, and P.

As used herein, the term "nitrile compound" refers to a compound containing a cyano (—CN) functional group.

As used herein, the term "halogen" covers F, Cl, Br or I.

As used herein, the term "bond" covers a single bond, a carbon-carbon double bond or a carbon-carbon triple bond.

When the above substituents are substituted, the substituent may be selected from the group consisting of halogen, an aryl group, nitro, cyano, carboxyl, and a sulfate group.

As used herein, the content of each component in the electrolyte is calculated based on the total weight of the electrolyte.

I. Electrolyte

The present application provides an electrolyte comprising a cesium salt and a nitrile compound.

In some embodiments, the cesium salt includes one or more of cesium hexafluorophosphate ($CsPF_6$), cesium oxalate ($Cs_2C_2O_4$), cesium nitrate ($CsNO_3$), cesium trifluoromethanesulfonate ($CsCF_3SO_3$), cesium bis(trifluoromethylsulphonyl)imide (CsTFSI), cesium tetrafluoroborate ($CsBF_4$) and cesium carbonate ($CsCO_3$).

In some embodiments, the content of the cesium salt is about 0.01 wt % to about 1.5 wt % based on the total weight of the electrolyte. In some embodiments, the content of the cesium salt is about 0.01 wt % to about 1 wt %. In some embodiments, the content of the cesium salt is about 0.05 wt % to about 1 wt %. In some embodiments, the content of the cesium salt is about 0.1 wt % to about 1 wt %. In some embodiments, the content of the cesium salt is about 0.2 wt % to about 0.8 wt %. In some embodiments, the content of the cesium salt is about 0.4 wt % to about 0.6 wt %. When the content of the cesium salt is about 0.01 wt % to about 1.5 wt %, it works in combination with the nitrile compound to form an intact and effective cathode electrolyte interface (CEI) film on the surface of the anode, whereby a uniform and stable solid electrolyte interface (SEI) film which facilitates lithium ions to pass through is effectively formed so as to improve the battery performance.

In some embodiments, the nitrile compound includes at least one of the compounds of Formula 1 to Formula 4:

Formula 1

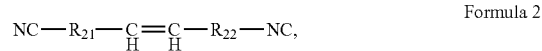

Formula 2

Formula 3

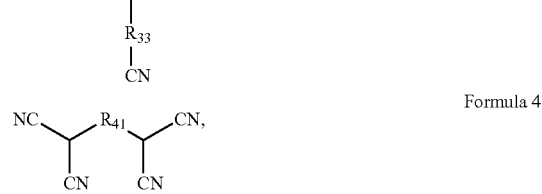

Formula 4 wherein $R_{11}$ is selected from a substituted or unsubstituted $C_{1-20}$ alkylene group, a substituted or unsubstituted $C_{1-12}$ alkylene group, a substituted or unsubstituted $C_{1-6}$ alkylene group, a substituted or unsubstituted $C_{1-20}$ alkyleneoxy group, a substituted or unsubstituted $C_{1-12}$ alkyleneoxy group or a substituted or unsubstituted $C_{1-6}$ alkyleneoxy group;

$R_{21}$ and $R_{22}$ are each independently selected from a bond, a substituted or unsubstituted $C_{1-20}$ alkylene group, a substituted or unsubstituted $C_{1-12}$ alkylene group, or a substituted or unsubstituted $C_{1-6}$ alkylene group;

$R_{31}$, $R_{32}$, and $R_{33}$ are each independently selected from a bond, a substituted or unsubstituted $C_{1-20}$ alkylene group, a substituted or unsubstituted $C_{1-12}$ alkylene group, a substituted or unsubstituted $C_{1-6}$ alkylene group, a substituted or unsubstituted $C_{1-20}$ alkyleneoxy group, a substituted or unsubstituted $C_{1-12}$ alkyleneoxy group, or a substituted or unsubstituted $C_{1-6}$ alkyleneoxy group; and $R_{41}$ is selected from a substituted or unsubstituted $C_{1-20}$ alkylene group, a substituted or unsubstituted $C_{1-12}$ alkylene group, a substituted or unsubstituted $C_{1-6}$ alkylene group, a substituted or unsubstituted $C_{2-20}$ alkenylene group, a substituted or unsubstituted $C_{2-12}$ alkenylene group, a substituted or unsubstituted $C_{2-6}$ alkenylene group, a substituted or unsubstituted $C_{6-50}$ arylene group, a substituted or unsubstituted $C_{6-26}$ arylene group, a substituted or unsubstituted $C_{6-12}$ arylene group, a substituted or unsubstituted $C_{6-10}$ cycloalkylene group, a substituted or unsubstituted $C_{2-20}$ heterocyclylene group, a substituted or unsubstituted $C_{2-12}$ heterocyclylene group or a substituted or unsubstituted $C_{2-6}$ heterocyclylene group;

wherein when substituted, the substituent is halogen.

In some embodiments, the halogen is F, Cl, Br or I.

In some embodiments, the nitrile compound includes at least one of:

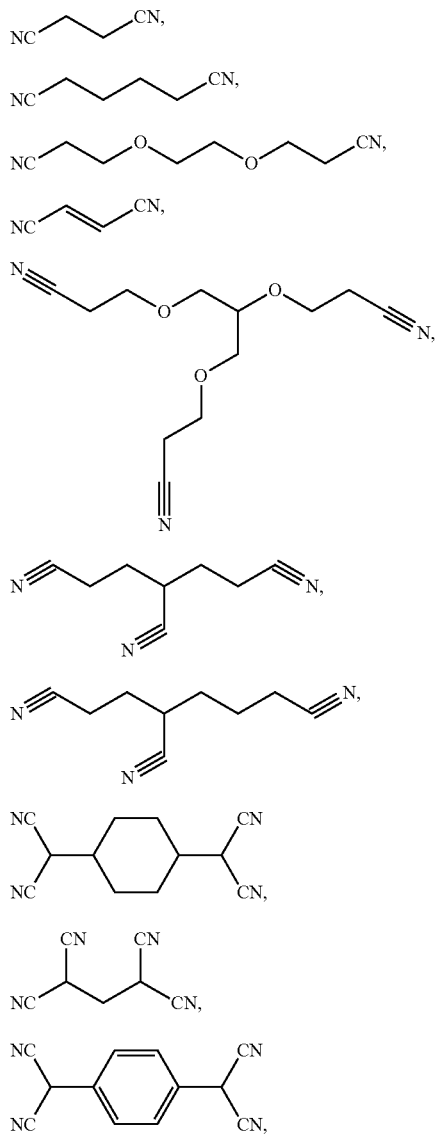

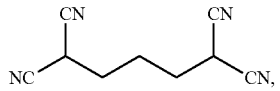

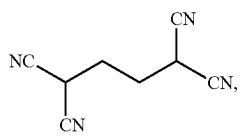

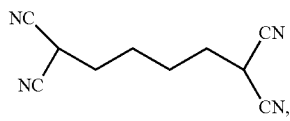

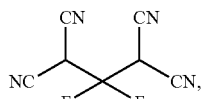

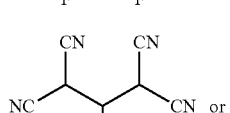

In some embodiments, the content of the nitrile compound is about 0.5 wt % to about 12 wt % based on the total weight of the electrolyte. In some embodiments, the content of the nitrile compound is about 0.5 wt % to about 8 wt %. In some embodiments, the content of the nitrile compound is about 0.5 wt % to about 6 wt %. In some embodiments, the content of the nitrile compound is about 1 wt % to about 10 wt %. In some embodiments, the content of the nitrile compound is about 2 wt % to about 8 wt %. In some embodiments, the content of the nitrile compound is about 2 wt % to about 6 wt %. When the content of the nitrile compound in the electrolyte is about 0.5 wt % to about 12 wt %, it works in combination with the cesium salt to prevent the dissolution of transition metal on the surface of the cathode and isolate the component susceptible to oxidization in the electrolyte, thereby significantly improving the rapid charge-discharge and floatation performances of the lithium ion batteries.

In some embodiments, the electrolyte further comprises lithium difluorophosphate, 1,3,2-dioxathiolane-2,2-dioxide, catechol sulfate or any combination thereof.

In some embodiments, the content of the additive is about 0.05 wt % to about 5 wt % based on the total weight of the electrolyte. In some embodiments, the content of the additive is about 0.05 wt % to about 3 wt %. In some embodiments, the content of the additive is about 0.05 wt % to about 2 wt %. In some embodiments, the content of the additive is about 0.01 wt % to about 2 wt %. In some embodiments, the content of the additive is about 0.5 wt % to about 1.5 wt %.

In some embodiments, the electrolyte comprises a lithium salt that is one or more selected from an inorganic lithium salt and an organic lithium salt. In some embodiments, the lithium salt is one or more selected from lithium hexafluorophosphate (LiPF$_6$), lithium tetrafluoroborate (LiBF$_4$), lithium hexafluoroarsonate (AsF$_6$Li), lithium perchlorate (LiClO$_4$), lithium bis(fluorosulphonyl)imide (LiFSI), lithium bis(trifluoromethanesulphonyl)imide (LiTFSI), lithium bis(oxalato)borate (LiB(C$_2$O$_4$)$_2$, LiBOB), and lithium difluoro(oxalato)borate (LiBF$_2$(C$_2$O$_4$), LiDFOB).

In some embodiments, the concentration of the lithium salt is about 0.5 mol/L to about 1.5 mol/L. In some embodiments, the concentration of the lithium salt is about 0.8 mol/L to about 1.3 mol/L. In some embodiments, the concentration of the lithium salt is about 0.5 mol/L to about 1.2 mol/L.

In some embodiments, the electrolyte further comprises a carbonate compound. The carbonate may be any kind of carbonate as long as it can be used as an organic solvent for a nonaqueous electrolyte.

In some embodiments, the carbonate is a cyclic carbonate or a chain carbonate.

In some embodiments, the cyclic carbonate is one or more selected from ethylene carbonate, propylene carbonate, butylene carbonate, γ-butyrolactone, pentylene carbonate, fluoroethylene carbonate and their halogenated derivatives. The above cyclic carbonates may be used alone or in combination of two or more thereof.

In some embodiments, the chain carbonate is one or more selected from dimethyl carbonate, diethyl carbonate, dipropyl carbonate, and ethyl methyl carbonate. The above chain carbonates may be used alone or in combination of two or more thereof.

In some embodiments, the electrolyte further comprises a carboxylate, which is one or more selected from methyl propionate, methyl butyrate, ethyl acetate, propyl acetate, ethyl propionate, propyl propionate and ethyl butyrate.

The electrolyte of the present application may further comprises one or more selected from the group consisting of a cyclic carbonate having a carbon-carbon double bond, a fluorinated chain carbonate, a fluorinated cyclic carbonate, a fluoroether, or a compound having a sulfur-oxygen double bond.

In some embodiments, the cyclic carbonate having a carbon-carbon double bond useful in the present application includes, but is not limited to, vinylene carbonate, methyl vinylene carbonate, ethyl vinylene carbonate, 1,2-dimethyl vinylene carbonate, 1,2-diethyl vinylene carbonate, fluorovinylene carbonate, trifluoromethylvinylene carbonate, vinyl ethylene carbonate, 1-ethyl-2-vinylethylene carbonate, 1-n-propyl-2-vinylethylene carbonate, 1-methyl-2-vinylethylene carbonate, 1,1-divinylethylene carbonate, 1,2-divinylethylene carbonate, 1,1-dimethyl-2-methylene ethylene carbonate, and 1,1-diethyl-2-methylene ethylene carbonate. The cyclic carbonate having a carbon-carbon double bond may be used alone or in combination of two or more thereof.

In some embodiments, the content of the cyclic carbonate having a carbon-carbon double bond is not less than about 0.01 wt %, not less than about 0.1 wt %, or not less than about 0.3 wt % based on the total weight of the electrolyte. In some embodiments, the content of the cyclic carbonate having a carbon-carbon double bond is not less than about 0.5 wt %. In some embodiments, the content of the cyclic carbonate having a carbon-carbon double bond is not greater than about 5 wt %, not greater than about 3 wt %, or not greater than about 1 wt %.

In some embodiments, the fluorinated chain carbonate according to the present application includes, but is not limited to, fluoromethylmethyl carbonate, difluoromethylmethyl carbonate, trifluoromethylmethyl carbonate, trifluoroethylmethyl carbonate, or bis(trifluoroethyl) carbonate. The fluorinated chain carbonate may be used alone or in combination of two or more thereof.

In some embodiments, the content of the fluorinated chain carbonate is not less than about 0.01 wt % or not less than about 0.1 wt % based on the total weight of the electrolyte. In some embodiments, the content of the fluorinated chain carbonate is not less than about 0.3 wt %. In some embodiments, the content of the fluorinated chain carbonate is not less than about 0.5 wt %. In some other embodiments, the content of the fluorinated chain carbonate is not greater than about 3 wt % or not greater than about 5 wt %. In some other embodiments, the content of the fluorinated chain carbonate is not greater than about 1 wt %.

In some embodiments, the fluorinated cyclic carbonate according to the present application includes, but is not limited to, fluoroethylene carbonate, 4,4-difluoroethylene carbonate, 4,5-difluoroethylene carbonate, 4-fluoro-4-methylethylene carbonate, 4,5-difluoro-4-methylethylene carbonate, 4-fluoro-5-methylethylene carbonate, 4,4-difluoro-5-methylethylene carbonate, 4-(fluoromethyl)-ethylene carbonate, 4-(difluoromethyl)-ethylene carbonate, 4-(trifluoromethyl)-ethylene carbonate, 4-(fluoromethyl)-4-fluoroethylene carbonate, 4-(fluoromethyl)-5-fluoroethylene carbonate, 4-fluoro-4,5-dimethylethylene carbonate, 4,5-difluoro-4,5-dimethylethylene carbonate, and 4,4-difluoro-5,5-dimethylethylene carbonate. The fluorinated cyclic carbonate may be used alone or in combination of two or more thereof.

In some embodiments, the content of the fluorinated cyclic carbonate is not less than about 0.1 wt % based on the total weight of the electrolyte. In some embodiments, the content of the fluorinated cyclic carbonate is not less than about 0.5 wt %. In some embodiments, the content of the fluorinated cyclic carbonate is not less than about 2 wt %. In some embodiments, the content of the fluorinated cyclic carbonate is not less than about 4 wt %. In some embodiments, the content of the fluorinated cyclic carbonate is not greater than about 15 wt %. In some embodiments, the content of the fluorinated cyclic carbonate is not greater than about 10 wt %. In some embodiments, the content of the fluorinated cyclic carbonate is not greater than about 8 wt %.

In some embodiments, the fluoroether of the present application includes, but is not limited to,
HCF$_2$CF$_2$CH$_2$OCF$_2$CF$_2$H, (CF$_3$)$_2$CFCF(CF$_2$CF$_3$)(OCH$_3$), CF$_3$CHFCF$_2$CH(CH$_3$)OCF$_2$CHFCF$_3$, HCF$_2$CF$_2$CH$_2$OCF$_2$CF$_2$CF$_2$CF$_2$H, HCF$_2$CF$_2$OCH$_2$CF$_3$, HCF$_2$CF$_2$OCH$_2$CH$_2$OCF$_2$CF$_2$H, HCF$_2$CF$_2$OCH$_2$CH$_2$CH$_2$OCF$_2$CF$_2$H, HCF$_2$CF$_2$CH$_2$OCF$_2$CF$_2$CF$_2$H, HCF$_2$CF$_2$OCH$_2$CH$_2$OCF$_2$CF$_2$H, HCF$_2$CF$_2$OCH$_2$CH$_2$CH$_2$OCF$_2$CF$_2$H, CH$_3$OCH$_2$CH$_2$OCH$_2$CH$_2$F, CH$_3$OCH$_2$CH$_2$OCH$_2$CF$_3$, CH$_3$OCH$_2$CH(CH$_3$)OCH$_2$CH$_2$F, CH$_3$OCH$_2$CH(CH$_3$)OCH$_2$CF$_3$, FCH$_2$CH$_2$OCH$_2$CH$_2$OCH$_2$CH$_2$F, FCH$_2$CH$_2$OCH$_2$CH(CH$_3$)OCH$_2$CH$_2$F, CF$_3$CH$_2$O(CH$_2$CH$_2$O)$_2$CH$_2$CF$_3$, and CF$_3$CH$_2$OCH$_2$CH(CH$_3$)OCH$_2$CF$_3$.

In some embodiments, the content of the fluoroether is not less than about 0.01 wt %, not less than about 0.1 wt %, or not less than about 0.5 wt % based on the total weight of the electrolyte. In some embodiments, the content of the fluoroether is not greater than about 5 wt %, not greater than about 4 wt %, not greater than about 3 wt %, or not greater than about 2 wt %.

In some embodiments, the compound having a sulfur-oxygen double bond according to the present application includes, but is not limited to, a cyclic sulfate, a chain sulfate, a chain sulfonate, a cyclic sulfonate, a chain sulfite, a cyclic sulfite, a chain sulfone, a cyclic sulfones, and so on. The compound having a sulfur-oxygen double bond may be used alone or in combination of two or more thereof.

In some embodiments, the content of the compound having a sulfur-oxygen double bond is not less than about 0.01 wt %, based on the total weight of the electrolyte. In some embodiments, the content of the compound having a sulfur-oxygen double bond is not less than about 0.1 wt %. In some embodiments, the content of the compound having a sulfur-oxygen double bond is not less than about 0.3 wt %. In some embodiments, the content of the compound having a sulfur-oxygen double bond is not less than about 0.5 wt %. In some other embodiments, the content of the compound having a sulfur-oxygen double bond is not greater than about 5 wt %. In some embodiments, the content of the compound having a sulfur-oxygen double bond is not greater than about 4 wt %. In some embodiments, the content of the compound having a sulfur-oxygen double bond is not greater than about 3 wt %.

In some embodiments, the cyclic sulfate according to the present application includes, but is not limited to, 1,3-propylene sulfate, 1,2-butylene sulfate, 1,3-butylene sulfate, 1,4-butylene sulfate, 1,2-pentylene sulfate, 1,3-pentylene sulfate, 1,4-pentylene sulfate, and 1,5-pentylene sulfate. The cyclic sulfate may be used alone or in combination of two or more thereof.

In some embodiments, the chain sulfate according to the present application includes, but is not limited to, a dialkyl sulfate such as dimethyl sulfate, methyl ethyl sulfate, and diethyl sulfate. The chain sulfate may be used alone or in combination of two or more thereof.

In some embodiments, the chain sulfonate according to the present application includes, but is not limited to, methyl fluorosulfonate, ethyl fluorosulfonate, methyl methanesulfonate, ethyl methanesulfonate, butyl dimesylate, methyl 2-(methylsulfonyloxy)propionate, ethyl 2-(methylsulfonyloxy)propionate, methyl methanesulfonyloxyacetate, ethyl methanesulfonyloxyacetate, phenyl methanesulfonate, and pentafluorophenyl methanesulfonate. The chain sulfonate may be used alone or in combination of two or more thereof.

In some embodiments, the cyclic sulfonate mentioned in the present application includes, but is not limited to, 1,3-propanesultone, 1-fluoro-1,3-propanesultone, 2-fluoro-1,3-propanesultone, 3-fluoro-1,3-propanesultone, 1-methyl-1,3-propanesultone, 2-methyl-1,3-propanesultone, 3-methyl-1,3-propanesultone, 1-propene-1,3-sultone, 2-propene-1,3-sultone, 1-fluoro-1-propene-1,3-sultone, 2-fluoro-1-propene-1,3-sultone, 3-fluoro-1-propene-1,3-sultone, 1-fluoro-2-propene-1,3-sultone, 2-fluoro-2-propene-1,3-sultone, 3-fluoro-2-propene-1,3-sultone, 1-methyl-1-propene-1,3-sultone, 2-methyl-1-propene-1,3-sultone, 3-methyl-1-propene-1,3-sultone, 1-methyl-2-propene-1,3-sultone, 2-methyl-2-propene-1,3-sultone, 3-methyl-2-propene-1,3-sultone, 1,4-butane sultone, 1,5-pentane sultone, methylene methanedisulfonate, and ethylene methanedisulfonate. The cyclic sulfonate may be used alone or in combination of two or more thereof.

In some embodiments, the chain sulfite according to the present application includes, but is not limited to, dimethyl sulfite, methyl ethyl sulfite, and diethyl sulfite. The chain sulfite may be used alone or in combination of two or more thereof.

In some embodiments, the cyclic sulfite mentioned in the present application includes, but is not limited to, 1,2-ethylene sulfite, 1,2-propylene sulfite, 1,3-propylene sulfite, 1,2-butylene sulfite, 1,3-butylene sulfite, 1,4-butylene sulfite, 1,2-pentylene sulfite, 1,3-pentylene sulfite, 1,4-pentylene sulfite, and 1,5-pentylene sulfite. The cyclic sulfite may be used alone or in combination of two or more thereof.

In some embodiments, the chain sulfone according to the present application includes, but is not limited to, a dialkyl sulfone compound such as dimethyl sulfone, and diethyl sulfone.

In some embodiments, the cyclic sulfone according to the present application includes, but is not limited to, sulfolane, methyl sulfolane, 4,5-dimethyl sulfolane, and sulfolene. The cyclic sulfone may be used alone or in combination of two or more thereof.

In some embodiments, the electrolyte may further comprise other additives which are well known in the art for improving battery performance, such as SEI film forming additives, flame retardant additives, anti-overcharge additives, and conductive additives, etc.

II. Electrochemical Device

The electrochemical device of the present invention includes any device in which an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery. In some embodiments, the electrochemical device of the present application is an electrochemical device having a cathode having a cathode active material capable of absorbing and releasing metal ions; an anode having an anode active material capable of absorbing and releasing metal ions, and characterized by comprising any of the electrolytes of the present application.

Electrolyte

The electrolyte used in the electrochemical device of the present application is any of the aforementioned electrolytes according to the present application. Moreover, the electrolyte used in the electrochemical device of the present application may include other electrolytes falling within the scope of present application.

Anode

The anode material used in the electrochemical device of the present application, and the construction and manufacturing methods thereof are not particularly limited, and may be any of the techniques disclosed in the prior art. In some embodiments, the anode may be one described in U.S. Pat. No. 9,812,739B2, which is incorporated herein by reference in its entirety.

In some embodiments, the anode includes a current collector and an anode active material layer on the current collector. The anode active material includes a material that reversibly intercalates/deintercalates lithium ions. In some embodiments, the material that reversibly intercalates/deintercalates lithium ions includes a carbon material. In some embodiments, the carbon material may be any carbon-based anode active material commonly used in lithium ion rechargeable batteries. In some embodiments, the carbon material includes, but is not limited to, crystalline carbon, amorphous carbon, or a mixture thereof. The crystalline carbon may be formless or plate-shaped, platelet-shaped, spherical or fibrous natural graphite or artificial graphite. The amorphous carbon may be soft carbon, hard carbon, carbonized mesophase pitch, calcined coke, and the like.

In some embodiments, the anode active material layer comprises an anode active material. In some embodiments, the anode active material includes, but is not limited to, lithium metal, structured lithium metal, natural graphite, artificial graphite, mesocarbon microbeads (MCMB), hard carbon, soft carbon, silicon, a silicon-carbon composite, a Li—Sn alloy, a Li—Sn—O alloy, Sn, SnO, $SnO_2$, lithiated $TiO_2$—$Li_4Ti_5O_{12}$ having a spinel structure, a Li—Al alloy and any combination thereof.

When the anode comprises a silicon-carbon compound, based on the total weight of the anode active material, the ratio of silicon:carbon is about 1:10 to about 10:1, and the median diameter D50 of the silicon-carbon compound is about 0.1 μm to about 100 μm. When the anode comprises an alloy material, an anode active material layer can be formed by vapor deposition, sputtering, or plating. When the anode comprises lithium metal, an anode active material layer is formed by, for example, a conductive skeleton of a twisted spherical shape and metal particles dispersed in the conductive skeleton. In some embodiments, the conductive skeleton of the twisted spherical shape may have a porosity of about 5% to about 85%. In some embodiments, a protective layer may be further disposed on the anode active material layer of lithium metal.

In some embodiments, the anode active material layer comprises a binder, and optionally a conductive material. The binder increases the binding of the anode active material particles to each other and the binding of the anode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, nylon and so on.

In some embodiments, the conductive material includes, but is not limited to, a carbon based material, a metal based material, a conductive polymer, or a mixture thereof. In some embodiments, the carbon-based material is selected from natural graphite, artificial graphite, carbon black, acetylene black, Ketjen black, carbon fiber, or any combinations thereof. In some embodiments, the metal based material is selected from metal powders, metal fibers, copper, nickel, aluminum, and silver. In some embodiments, the conductive polymer is a polyphenylene derivative.

In some embodiments, the current collector includes, but is not limited to, copper foil, nickel foil, stainless steel foil, titanium foil, foamed nickel, foamed copper, polymeric substrates coated with a conductive metal, and any combinations thereof.

The anode can be produced by a production method well known in the art. For example, the anode can be obtained by mixing an active material, a conductive material and a binder in a solvent to prepare an active material composition, and coating the active material composition on a current collector. In some embodiments, the solvent may include, but is not limited to, water.

Cathode

The cathode material used in the electrochemical device of the present application can be prepared using materials, construction and manufacturing methods well known in the art. In some embodiments, the cathode of the present application can be prepared using the technique described in U.S. Pat. No. 9,812,739B2, which is incorporated herein by reference in its entirety.

In some embodiments, the cathode includes a current collector and a cathode active material layer on the current collector. The cathode active material includes at least one lithiated intercalation compound that reversibly intercalates and deintercalates lithium ions. In some embodiments, the cathode active material comprises a composite oxide. In some embodiments, the composite oxide contains lithium and at least one element selected from the group consisting of cobalt, manganese, and nickel.

In some embodiments, the cathode active material is selected from lithium cobaltate ($LiCoO_2$), lithium nickel cobalt manganese (NCM) ternary material, lithium iron phosphate ($LiFePO_4$), lithium manganate ($LiMn_2O_4$) and any combinations thereof.

In some embodiments, the cathode active material is selected from a mixture of lithium cobalt oxide and a lithium nickel manganese cobalt ternary material. In some embodiments, the weight ratio of lithium cobalt oxide to the lithium nickel manganese cobalt ternary material is about 1:9 to about 9:1. In some embodiments, the weight ratio of lithium cobalt oxide to the lithium nickel manganese cobalt ternary material is about 2:8 to about 8:2. In some embodiments, the weight ratio of lithium cobalt oxide to the lithium nickel manganese cobalt ternary material is about 4:6 to about 6:4.

In some embodiments, the cathode active material may have a coating on its surface or may be mixed with another compound having a coating. The coating may include at least one coating element compound selected from the group consisting of an oxide of a coating element, a hydroxide of a coating element, an oxyhydroxide of a coating element, an oxycarbonate of a coating element, and a hydroxycarbonate of a coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combinations thereof. The coating can be applied by any method as long as the method does not adversely affect the performance of the cathode active material. For example, the method may include any coating method known in the art, such as spraying, dipping, and others.

The cathode active material layer further comprises a binder, and optionally a conductive material. The binder increases the binding of the cathode active material particles to each other and the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, nylon and so on.

In some embodiments, the conductive material includes, but is not limited to, a carbon based material, a metal based material, a conductive polymer, and a mixture thereof. In some embodiments, the carbon-based material is selected from natural graphite, artificial graphite, carbon black, acetylene black, Ketjen black, carbon fiber, and any combinations thereof. In some embodiments, the metal based material is selected from metal powders, metal fibers, copper, nickel, aluminum, and silver. In some embodiments, the conductive polymer is a polyphenylene derivative.

In some embodiments, the current collector may be, but is not limited to, aluminum.

The cathode can be prepared by a preparation method well known in the art. For example, the cathode can be obtained by mixing an active material, a conductive material and a binder in a solvent to prepare an active material composition, and coating the active material composition on a current collector. In some embodiments, the solvent may include, but is not limited to, N-methylpyrrolidone or the like.

In some embodiments, the cathode is prepared by forming a cathode material with a cathode active material layer including a lithium-transition metal compound powder and a binder on a current collector.

In some embodiments, the cathode active material layer can generally be produced by dry mixing a cathode material and a binder (and a conductive material and a thickener if needed) to form flakes, and pressing the obtained flakes on a cathode current collector; or dissolving or dispersing the material in a liquid medium to form a slurry, coating the slurry on a cathode current collector, and drying. In some embodiments, the material of the cathode active material layer includes any material known in the art.

Separator

In some embodiments, the electrochemical device of the present application is provided with a separator between the cathode and the anode to prevent short circuit. The material and shape of the separator used in the electrochemical device of the present application are not particularly limited, and may be any of the techniques disclosed in the prior art. In some embodiments, the separator includes a polymer or an inorganic substance or the like formed of a material which is stable against the electrolyte of the present application.

For example, the separator may include a substrate layer and a surface treatment layer. The substrate layer is a non-woven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, and a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer comprises inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, boehmite, aluminum hydroxide, magnesium hydroxide, calcium hydroxide and barium sulfate, or a combination of more than one thereof. The binder is one selected from the group consisting of polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof. The polymer layer contains a polymer, and the material of the polymer includes at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

III. Application

The electrolyte according to the embodiments of the present application can be used to enhance the rate performance of the battery, the capacity retention rate after storage at room temperature, and the cycle and high-temperature storage performance and is thus applicable to an electronic device comprising an electrochemical device.

The use of the electrochemical device according to the present application is not particularly limited, and can be used in various known applications, such as notebook computers, pen-input computers, mobile computers, e-book players, portable phones, portable fax machines, portable copiers, portable printers, head-mounted stereo headphones, video recorders, LCD TVs, portable cleaners, portable CD players, Mini discs, transceivers, electronic notebooks, calculators, memory cards, portable recorders, radios, backup power sources, motors, vehicles, motorcycles, scooters, bicycles, lighting apparatus, toys, game consoles, clocks, electric tools, flashing light, cameras, large batteries for household use, or lithium ion capacitors.

Examples

Hereinafter, the present application will be specifically described by way of examples and comparative examples; however, the present application is not limited thereto as long as they do not deviate from the spirit of the present application.

1. Preparation of the Lithium-Ion Battery (1) Preparation of the Cathode

The cathode active material lithium cobalt oxide (LiCoO$_2$), acetylene black and polyvinylidene fluoride (PVDF) were mixed fully at a weight ratio of 96:2:2 by stirring in a suitable amount of N-methylpyrrolidone (NMP) as a solvent, to form a uniform cathode slurry. The slurry was applied to an Al foil as a cathode current collector, dried, and cold pressed to obtain a cathode.

(2) Preparation of the Anode

Graphite, acetylene black, styrene-butadiene rubber (SBR), and carboxymethylcellulose sodium (CMC) were mixed fully at a weight ratio of 95:2:2:1 by stirring in a suitable amount of deionized water, to form a uniform anode slurry. The slurry was applied to a Cu foil as an anode current collector, dried, and cold pressed to obtain an anode.

(3) Preparation of the Electrolyte

In an argon atmosphere glovebox with a moisture content of <10 ppm, ethylene carbonate (EC), diethyl carbonate (DEC), and propylene carbonate (PC) were mixed uniformly at a weight ratio of 3:4:3. Then a fully dried lithium salt LiPF$_6$ was dissolved in the above non-aqueous solvent. Finally, an additive was added in a certain amount by weight percent, to prepare electrolytes in the examples and comparative examples. The concentration of LiPF$_6$ was 1.05 mol/L. The contents of each substance in the electrolyte were calculated based on the total weight of the electrolyte.

(4) Preparation of the Separator

A porous PE polymer film was used as a separator.

(5) Preparation of Lithium-Ion Battery

The cathode, the separator, and the anode were stacked in sequence, wherein the separator was placed between the cathode and the anode so as to separate the cathode and the anode, then wound up to obtain a bare battery. The bare battery was placed in the outer packaging foil. The electrolyte prepared above was injected into the dried battery, and after vacuum packaging, standing, formation, shaping, and other procedures, the preparation of the lithium ion battery was completed.

2. Performance Test Processes of the Lithium-Ion Battery (1) Floating charge test process: the battery was discharged to 3.0 V at 0.5 C at 25° C., then charged to 4.4 V at 0.5 C and then charged to 0.05 C at a constant voltage of 4.4 V, placed in an oven at 45° C., maintained at 4.4 V for 50 days, and monitored for the thickness change. The initial thickness at 50% State of Charge (SOC) was used as a reference.

2) Rapid charge-discharge test: the battery was charged to 4.4 V at 25° C. at 1.5 C and then charged to 0.05 C at 4.4 V, and discharged to 3.0 V at a constant current of 1.0 C. The above cycle was repeated 30 times, the capacity retention rate was monitored, and the battery was disassembled to observe the degree of lithium precipitation.

Capacity retention rate=remaining discharge capacity/initial discharge capacity×100%

No lithium precipitation: No lithium precipitation is found or the area of lithium precipitation is <2%

Slight lithium precipitation: The area of lithium precipitation is between 2%-20%

Serious lithium precipitation: The area of lithium precipitation is >20%

(3) Cycle Performance Test:

The lithium ion battery was placed in an incubator at 45° C. and allowed to stand for 30 minutes to allow the lithium ion battery to reach a constant temperature. The lithium ion battery reaching a constant temperature was charged to a voltage of 4.4 V at a constant current of 1 C, then charged at a constant voltage of 4.4 V until the current was 0.05 C, and then discharged to a voltage of 3.0V at a constant current of 1 C. The above was a charge-discharge cycle. The above charge-discharge cycle was repeated and the capacity retention rate of the battery after 500 cycles was calculated.

Capacity retention rate (%) of the lithium ion battery after $N$ cycles=discharge capacity after the $N$th cycle/the first discharge capacity×100%.

A. Electrolytes and lithium ion batteries of Examples 1-26 and Comparative Examples 1-3 were prepared as described above. The floating test performance and rapid charge-discharge performance of the lithium-ion batteries were tested. The test results were shown in Table 1.

TABLE 1

| No. | Cesium salt compound Structure of compound | Content (wt %) | Nitrile compound Structure of compound | Content (wt %) | Floating test | Rapid charge-discharge performance Capacity retention rate | Degree of lithium precipitation |
|---|---|---|---|---|---|---|---|
| Example 1 | CsPF$_6$ | 0.2 | I-1 | 3 | 24.00% | 93.20% | No lithium precipitation |
| Example 2 | CsPF$_6$ | 0.2 | III-3 | 2 | 16.00% | 94.00% | No lithium precipitation |
| Example 3 | CsPF$_6$ | 0.2 | IV-2 | 2 | 13.00% | 94.80% | No lithium precipitation |
| Example 4 | CsNO$_3$ | 0.2 | I-1 | 3 | 26.00% | 92.80% | No lithium precipitation |
| Example 5 | CsNO$_3$ | 0.2 | III-3 | 2 | 17.00% | 93.20% | No lithium precipitation |
| Example 6 | CsNO$_3$ | 0.2 | IV-2 | 2 | 15.00% | 93.60% | No lithium precipitation |
| Example 7 | CsPF$_6$ | 0.2 | I-1 + III-3 | 2 + 1 | 9.60% | 93.90% | No lithium precipitation |
| Example 8 | CsPF$_6$ | 0.05 | I-1 + III-3 | 2 + 1 | 10.70% | 91.90% | Slight lithium precipitation |
| Example 9 | CsPF$_6$ | 0.1 | I-1 + III-3 | 2 + 1 | 10.20% | 92.40% | No lithium precipitation |
| Example 10 | CsPF$_6$ | 0.5 | I-1 + III-3 | 2 + 1 | 8.30% | 94.50% | No lithium precipitation |
| Example 11 | CsPF$_6$ | 1 | I-1 + III-3 | 2 + 1 | 7.70% | 95.10% | No lithium precipitation |
| Example 12 | CsPF$_6$ | 0.2 | I-2 | 3 | 24.20% | 93.10% | No lithium precipitation |
| Example 13 | CsPF$_6$ | 0.2 | I-3 | 2 | 23.90% | 93.00% | No lithium precipitation |
| Example 14 | CsPF$_6$ | 0.2 | III-1 | 2 | 16.30% | 93.80% | No lithium precipitation |
| Example 15 | CsPF$_6$ | 0.2 | IV-3 | 2 | 14.20% | 93.10% | No lithium precipitation |
| Example 16 | CsPF$_6$ | 0.2 | IV-5 | 2 | 14.30% | 93.20% | No lithium precipitation |
| Example 17 | CsPF$_6$ | 0.2 | I-1 + III-1 | 2 + 1 | 9.80% | 93.70% | No lithium precipitation |
| Example 18 | CsPF$_6$ | 0.2 | I-2 + III-1 | 2 + 1 | 9.70% | 93.70% | No lithium precipitation |
| Example 19 | CsPF$_6$ | 0.2 | I-1 + III-1 | 1 + 2 | 7.70% | 93.40% | No lithium precipitation |
| Example 20 | CsPF$_6$ | 0.2 | I-1 + III-3 | 1 + 2 | 7.60% | 93.20% | No lithium precipitation |
| Example 21 | CsPF$_6$ | 0.2 | I-1 + III-3 | 2 + 2 | 7.10% | 95.00% | No lithium precipitation |
| Example 22 | CsPF$_6$ | 0.2 | I-1 + III-3 | 4 + 2 | 6.80% | 94.80% | No lithium precipitation |
| Example 23 | CsPF$_6$ | 0.2 | I-1 + I-2 + I-3 | 3 + 1 + 4 | 6.40% | 93.70% | No lithium precipitation |
| Example 24 | CsPF$_6$ | 0.2 | I-1 + I-3 | 7 + 3 | 6.00% | 92.90% | Slight lithium precipitation |

TABLE 1-continued

| No. | Cesium salt Structure of compound | Content (wt %) | Nitrile compound Structure of compound | Content (wt %) | Floating test | Rapid charge-discharge performance Capacity retention rate | Degree of lithium precipitation |
|---|---|---|---|---|---|---|---|
| Example 25 | $CsPF_6$ | 0.2 | I-1 + I-3 | 7 + 5 | 5.40% | 91.70% | Slight lithium precipitation |
| Example 26 | $Cs_2C_2O_4$ | 0.2 | I-1 + III-3 | 2 + 1 | 9.70% | 93.50% | No lithium precipitation |
| Comparative Example 1 | — | — | — | — | 50.50% | 78.50% | Serious lithium precipitation |
| Comparative Example 2 | $CsPF_6$ | 0.2 | — | — | 45.10% | 89.20% | Slight lithium precipitation |
| Comparative Example 3 | — | — | I-1 | 3 | 30.40% | 83.30% | Lithium precipitation |

"—" denotes that the substance is not present.

It can be seen from the test results of Comparative Example 1 that when the cesium salt and the nitrile compound additive of particular structure were not added to the electrolyte, the lithium precipitation of the battery was serious, the capacity retention rate after rapid charge and discharge was low, and the gassing after floating test is significant.

It can be seen through comparison of the test results of Examples 1-26 with Comparative Examples 1-3 that when both the cesium salt and the nitrile compound additive of particular structure were added to the electrolyte, both the floating test performance and rapid charge-discharge performance (degree of lithium precipitation and capacity retention rate) of the battery can be improved. This was because the combination of the cesium salt and the nitrile compound additive of particular structure can form a thin and uniform SEI film, which has a higher lithium ion transportation capacity, is more stable, and can reduce the gas production from oxidation at the anode and improve the floating performance of the battery.

It can be seen from the test results of Examples 7-11 that the floating performance and rapid charge-discharge performance of the lithium ion battery were significantly improved when 0.05 to 1 wt % of the cesium salt was added to the electrolyte containing the nitrile compound additive.

B. One or more of $LiPO_2F_2$, 1,3,2-dioxathiolane-2,2-dioxide (DTD)

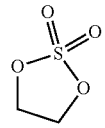

or catechol sulfate

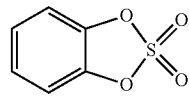

were further added to the electrolyte of Example 7, to obtain the electrolytes and lithium ion batteries of Examples 27-41. The rapid charge-discharge performance and the capacity retention rate after cycles at 45 C of the lithium ion battery were tested. The test results were shown in Table 2.

TABLE 2

| No. | $LiPO_2F_2$ (wt %) | DTD (wt %) | Catechol sulfate (wt %) | Rapid charge-discharge performance Capacity retention rate | Degree of lithium precipitation | Capacity retention rate after cycles at 45° C. |
|---|---|---|---|---|---|---|
| Example 7 | — | — | — | 93.90% | No lithium precipitation | 78.80% |
| Example 27 | 0.5 | — | — | 94.40% | No lithium precipitation | 81.50% |
| Example 28 | 1 | — | — | 94.80% | No lithium precipitation | 82.40% |
| Example 29 | 1.5 | — | — | 94.90% | No lithium precipitation | 82.60% |
| Example 30 | — | 0.1 | — | 94.20% | No lithium precipitation | 80.90% |
| Example 31 | — | 0.5 | — | 94.60% | No lithium precipitation | 81.90% |
| Example 32 | — | 1 | — | 94.90% | No lithium precipitation | 82.80% |
| Example 33 | — | — | 0.1 | 94.10% | No lithium precipitation | 80.70% |

TABLE 2-continued

| No. | LiPO$_2$F$_2$ (wt %) | DTD (wt %) | Catechol sulfate (wt %) | Rapid charge-discharge performance | | Capacity retention rate after cycles at 45° C. |
| --- | --- | --- | --- | --- | --- | --- |
| | | | | Capacity retention rate | Degree of lithium precipitation | |
| Example 34 | — | — | 0.5 | 94.30% | No lithium precipitation | 81.40% |
| Example 35 | — | — | 1 | 94.80% | No lithium precipitation | 82.30% |
| Example 36 | — | — | 1.5 | 94.90% | No lithium precipitation | 82.60% |
| Example 37 | 0.5 | 1 | — | 95.50% | No lithium precipitation | 83.60% |
| Example 38 | 0.5 | — | 1 | 95.20% | No lithium precipitation | 83.30% |
| Example 39 | 0.5 | — | 0.5 | 94.90% | No lithium precipitation | 82.80% |
| Example 40 | — | 0.5 | 0.5 | 95.00% | No lithium precipitation | 83.90% |
| Example 41 | 0.5 | 0.5 | 0.5 | 95.30% | No lithium precipitation | 84.10% |

"—" denotes that the substance is not present.

It can be seen from the test results of Examples 27-41 and Example 7 that adding one or more of LiPO$_2$F$_2$, DTD, and catechol sulfate to the electrolyte can further improve the high-rate charge performance and the cycle performance at 45° C. of the battery.

Several embodiments have been illustrated above, and the present invention is not limited thereto in any way. Although the present invention has been described through preferred embodiments, they are not intended to limit the scope of the present invention. It should be understood by any person of skill in the art that changes and modifications made to the technical contents disclosed above without departing from the scope of the technical solution of the present invention are equivalent implementations, and are all contemplated in the protection scope of the present invention.

References throughout the specification to "some embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by those skilled in the art that the embodiments are not to be construed as limiting the present invention, and modifications, substitutions and changes can be made to the embodiments without departing from the spirit and scope of the present application.

The above-described embodiments of the present invention are intended to be illustrative only. Numerous alternative embodiments may be devised by persons skilled in the art without departing from the scope of the following claims.

What is claimed is:

1. An electrolyte, comprising a cesium salt and a nitrile compound,
wherein the cesium salt comprises one or more of cesium hexafluorophosphate, cesium oxalate, cesium nitrate, cesium trifluoromethanesulfonate, cesium bis(trifluoromethylsulphonyl)imide, cesium tetrafluoroborate and cesium carbonate; and the nitrile compound comprises at least one of the compound represented by Formula III-1 or Formula III-3:

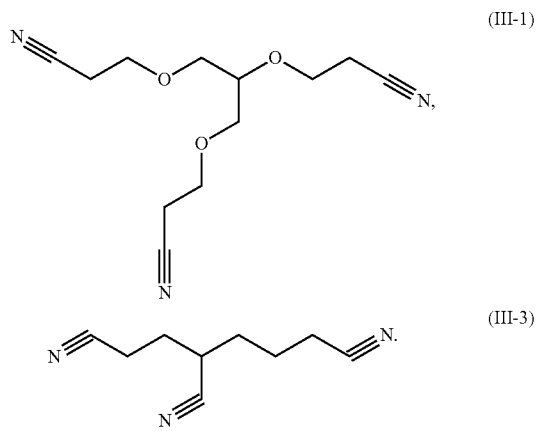

2. The electrolyte according to claim 1, wherein the nitrile compound further comprises at least one of the compounds of Formula 2 or Formula 4:

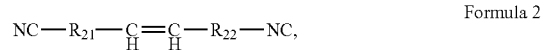

Formula 2

Formula 4 wherein $R_{21}$ and $R_{22}$ are each independently selected from a bond, or a substituted or unsubstituted $C_{1-12}$ alkylene group;

wherein $R_{41}$ is selected from a substituted or unsubstituted $C_{1-12}$ alkylene group, a substituted or unsubstituted $C_{2-12}$ alkenylene group, a substituted or unsubstituted $C_{6-26}$ arylene group, a substituted or unsubstituted $C_{6-10}$ cycloalkylene group or a substituted or unsubstituted $C_{2-12}$ heterocyclylene group;

wherein when substituted, the substituent is halogen.

3. The electrolyte according to claim 1, wherein the content of the cesium salt is about 0.01 wt % to about 1.5 wt % based on the total weight of the electrolyte.

4. The electrolyte according to claim 1, wherein the nitrile compound further comprises the compounds of Formula 1:

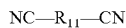

NC—$R_{11}$—CN     Formula 1 wherein $R_{11}$ is selected from a substituted or unsubstituted $C_{1-12}$ alkylene group or a substituted or unsubstituted $C_{1-12}$ alkyleneoxy group; and wherein when substituted, the substituent is halogen.

5. The electrolyte according to claim 1, wherein the nitrile compound further comprises at least one of:

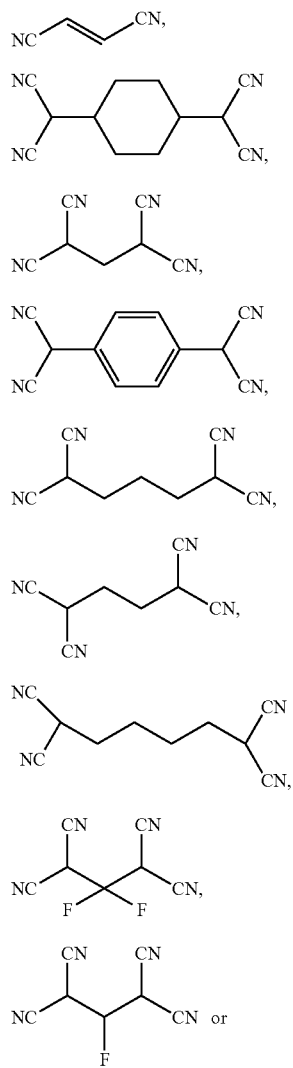

(II-1)

(IV-1)

(IV-2)

(IV-3)

(IV-4)

(IV-5)

(IV-6)

(IV-7)

(IV-8)

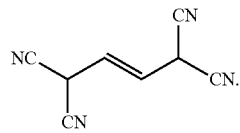

(IV-9)

6. The electrolyte according to claim 1, wherein the content of the nitrile compound is about 0.5 wt % to about 12 wt % based on the total weight of the electrolyte.

7. The electrolyte according to claim 1, further comprising additives, wherein the additives comprise lithium difluorophosphate, 1,3,2-dioxathiolane-2,2-dioxide, catechol sulfate or any combination thereof.

8. The electrolyte according to claim 7, wherein the content of the additive is about 0.05 wt % to about 5 wt % based on the total weight of the electrolyte.

9. An electrochemical device, comprising an electrolyte, wherein the electrolyte comprises a cesium salt and a nitrile compound, wherein the cesium salt comprises one or more of cesium hexafluorophosphate, cesium oxalate, cesium nitrate, cesium trifluoromethanesulfonate, cesium bis(trifluoromethylsulphonyl)imide, cesium tetrafluoroborate and cesium carbonate; and the nitrile compound comprises at least one of the compound represented by Formula III-1 or Formula III-3:

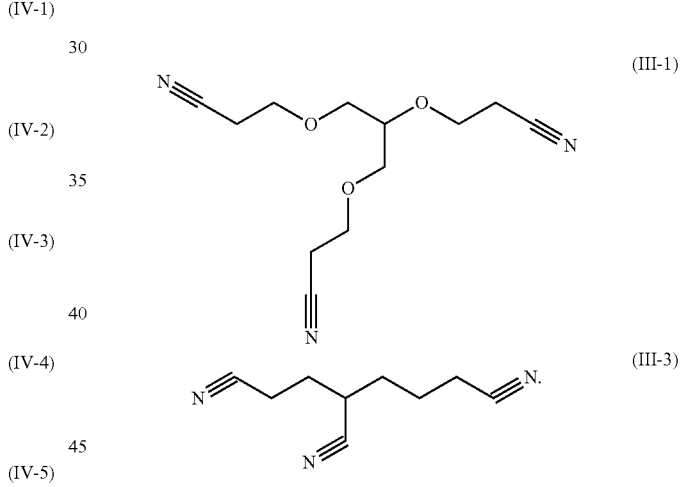

(III-1)

(III-3)

10. The electrochemical device according to claim 9, wherein the content of the cesium salt is about 0.01 wt % to about 1.5 wt % based on the total weight of the electrolyte.

11. The electrochemical device according to claim 9, wherein the nitrile compound further comprises the compounds of Formula 1:

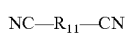

NC—$R_{11}$—CN     Formula 1 wherein $R_{11}$ is selected from a substituted or unsubstituted $C_{1-12}$ alkylene group or a substituted or unsubstituted $C_{1-12}$ alkyleneoxy group;

wherein when substituted, the substituent is halogen.

12. The electrochemical device according to claim 9, wherein the nitrile compound further comprises at least one of:

(II-1)

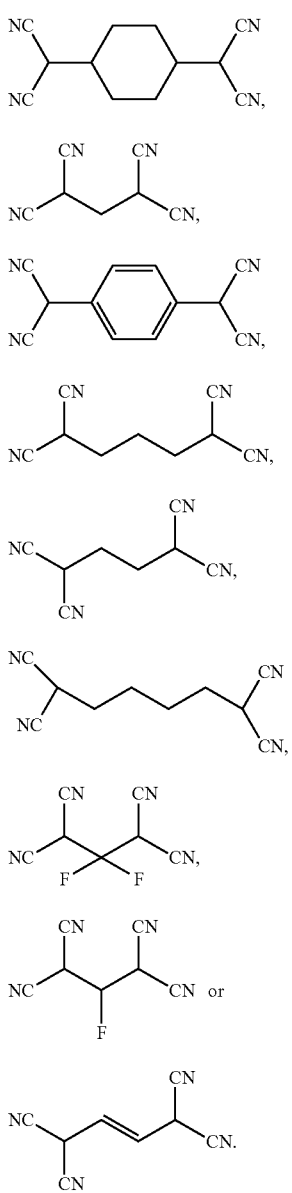

13. The electrochemical device according to claim 9, wherein the content of the nitrile compound is about 0.5 wt % to about 12 wt % based on the total weight of the electrolyte.

14. An electrolyte, comprising a cesium salt and a nitrile compound,
wherein the cesium salt comprises one or more of cesium hexafluorophosphate, cesium oxalate, cesium nitrate, cesium trifluoromethanesulfonate, cesium bis(trifluoromethylsulphonyl)imide, cesium tetrafluoroborate and cesium carbonate; and the nitrile compound comprises at least one compound represented by Formula 1, and at least one of Formula III-1 or Formula III-3:

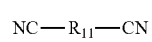 Formula 1

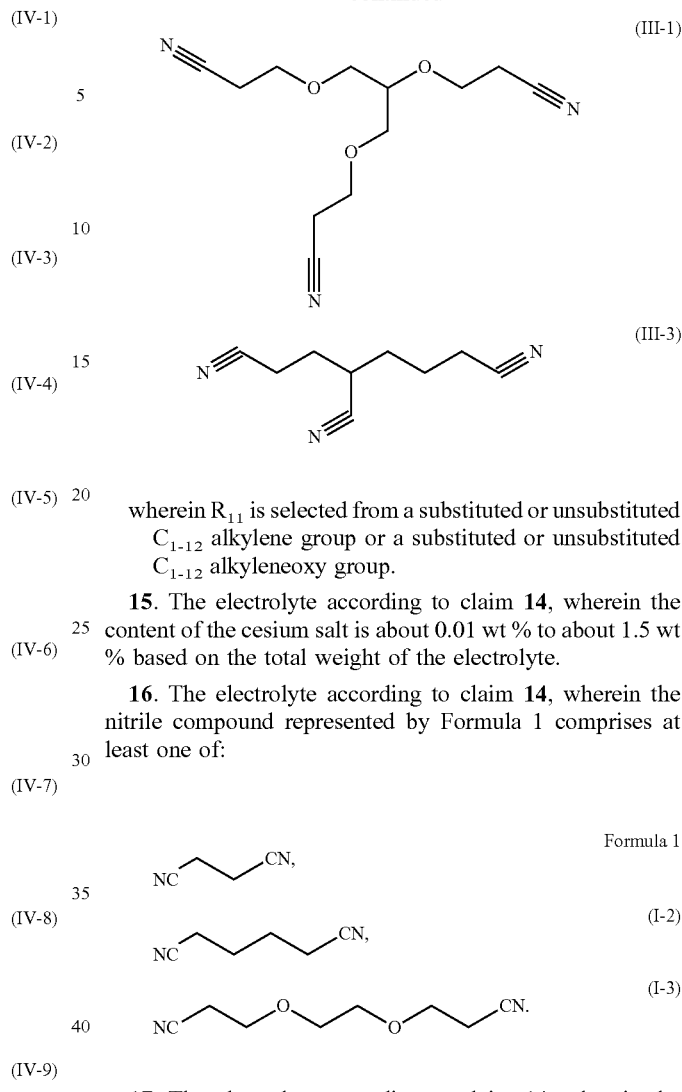

wherein $R_{11}$ is selected from a substituted or unsubstituted $C_{1-12}$ alkylene group or a substituted or unsubstituted $C_{1-12}$ alkyleneoxy group.

15. The electrolyte according to claim 14, wherein the content of the cesium salt is about 0.01 wt % to about 1.5 wt % based on the total weight of the electrolyte.

16. The electrolyte according to claim 14, wherein the nitrile compound represented by Formula 1 comprises at least one of:

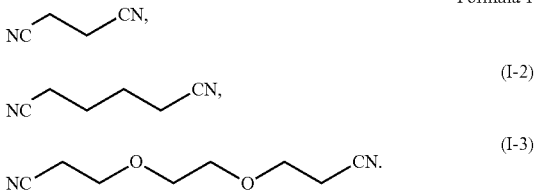

17. The electrolyte according to claim 14, wherein the nitrile compound further comprises at least one of:

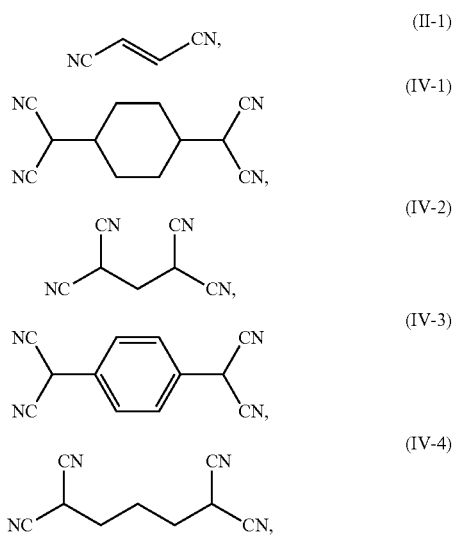

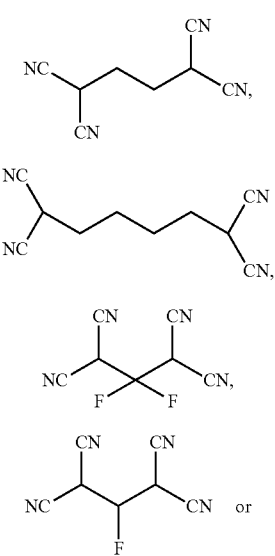

(IV-5)
(IV-6)
(IV-7)
(IV-8)

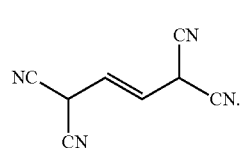

(IV-9)

18. The electrolyte according to claim 14, wherein the content of the nitrile compound is about 0.5 wt % to about 12 wt % based on the total weight of the electrolyte.

19. The electrolyte according to claim 14, further comprising additives, wherein the additives comprise lithium difluorophosphate, 1,3,2-dioxathiolane-2,2-dioxide, catechol sulfate or any combination thereof;

wherein the content of the additive is about 0.05 wt % to about 5 wt % based on the total weight of the electrolyte.

* * * * *